United States Patent [19]
Zehner

[11] Patent Number: 5,546,356
[45] Date of Patent: Aug. 13, 1996

[54] WIDE BEAM ACOUSTIC PROJECTOR WITH SHARP CUTOFF AND LOW SIDE LOBES

[75] Inventor: William J. Zehner, Lynn Haven, Fla.

[73] Assignee: The United States of America as represented by the Secretary of the Navy, Washington, D.C.

[21] Appl. No.: 83,607

[22] Filed: Jun. 30, 1993

[51] Int. Cl.⁶ ..................................................... G01S 15/00
[52] U.S. Cl. ............................................. 367/88; 367/103
[58] Field of Search ........................... 367/88, 92, 905, 367/103; 342/360, 379

[56] References Cited

U.S. PATENT DOCUMENTS

| | | | |
|---|---|---|---|
| 3,760,345 | 9/1973 | Hughes | 367/88 |
| 4,458,342 | 7/1984 | Tournois | 367/88 |
| 5,043,951 | 8/1991 | Gilmour et al. | 367/905 |
| 5,303,208 | 4/1994 | Dorr | 367/88 |

*Primary Examiner*—Ian J. Lobo
*Attorney, Agent, or Firm*—Edward J. Connors, Jr.; William C. Townsend; Kenneth W. Dobyns

[57] ABSTRACT

A pulsed-transmission, single frequency echo-ranging sonar system has a wide-beam acoustic projector with sharp cutoff of energy radiated in directions other than the desired field of view and a nearly constant amount of acoustic energy throughout the desired vertical field.

5 Claims, 4 Drawing Sheets

WIDE BEAM ACOUSTIC PROJECTOR WITH SHARP CUTOFF AND LOW SIDE LOBES

BACKGROUND OF THE INVENTION

This invention relates to pulsed-transmission, single frequency echo-ranging sonar systems, and more particularly to the array used to form the projected acoustic beam.

The principal object of this invention is to produce a nearly constant amount of acoustic energy throughout the desired vertical field of view (nominally 90 degrees).

A second object is to reduce or eliminate the amount of acoustic energy radiated in directions other than the desired field of view (cutoff region).

Another object is to cause a very rapid transition ("brick wall") from the desired field of view to the cutoff region.

Yet another object is to achieve the desired beam pattern improvement using an array with much less piezoelectric material than required by previous design methods.

DETAILED DESCRIPTION OF THE PREFERRED EMBODIMENTS

Figure 1:
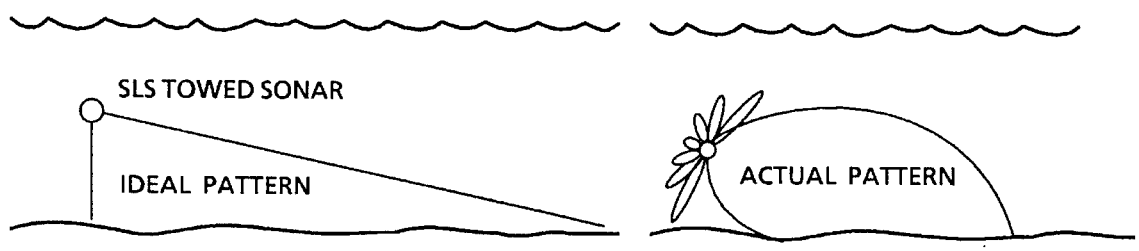
FIG. 1 is a showing of beam patterns in a plane normal to a vehicle.
Figure 2:
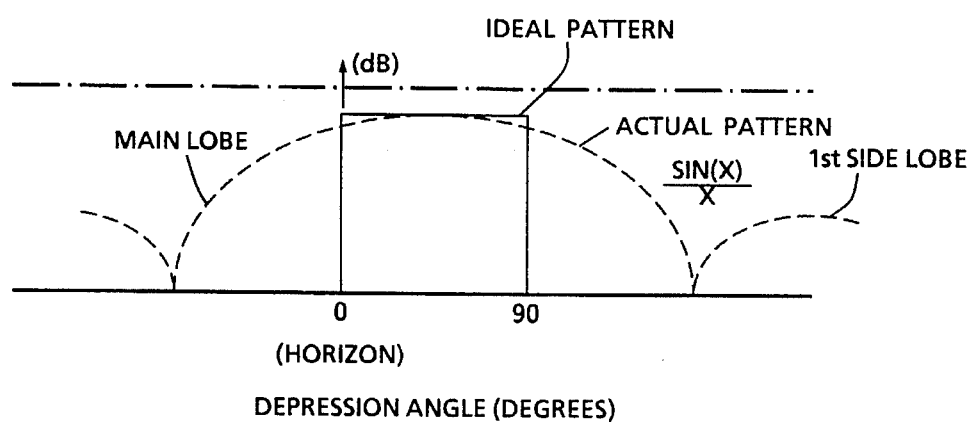
FIG. 2 is a showing of beam patterns.

Consider a side looking sonar (SLS) 10 (FIG. 1). Normally, an acoustic pulse is transmitted in a broad vertical beam (90°) on each side of the sonar vehicle depressed 45° below the horizon to cover the bottom from directly under the vehicle out to maximum range. Since SLSs are often used in shallow water, it is desirable to produce a beam with low sidelobes so that surface reverberation does not interfere with reception of signals echoed by the bottom and by targets located in the water column. In fact, an ideal beam would have no sidelobes and very sharp skirts on the main lobe 12 (FIG. 2). In practice, however, such a beam is not realizable. A simple line array, for example, produces a sin(x)/x response as shown by the dotted line in FIG. 2. For moderately small beams (say, 25° or less) various amplitude shading functions can be used to reduce side lobe levels, but the main lobe widens and its skirts become even less ideal when shaded. For larger beam widths, conventional shading is ineffective.

It is well known to those skilled in the art that the far field pressure distribution of an acoustic beam is the Fourier transform of the velocity distribution at the face of the transducer array used to form the beam. A common example is the sin(x)/x acoustic pattern created by a uniformly weighted line array. For the present application, the desired beam pattern is a unit response in the vertical field of view and zero elsewhere (i.e., the rectangle function). What has not been previously recognized is that this pattern can be obtained by driving a segmented line array with a sin(x)/x shading function. Consider a line array of N transducer elements periodically spaced at intervals of d. Let the driving voltage applied to the array be samples of a finite section of the sin(x)/x function:

$$f_i = \sin(x_i)/x_i, \text{ where}$$

$$x_i = 2K\pi i/(N-1) \text{ and}$$

N=number of array elements (odd)

Figure 3:
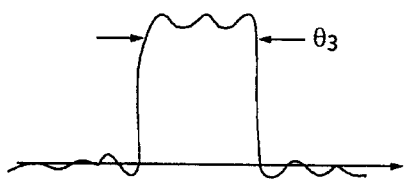
FIG. 3 is another plot of a function.
Figure 4:
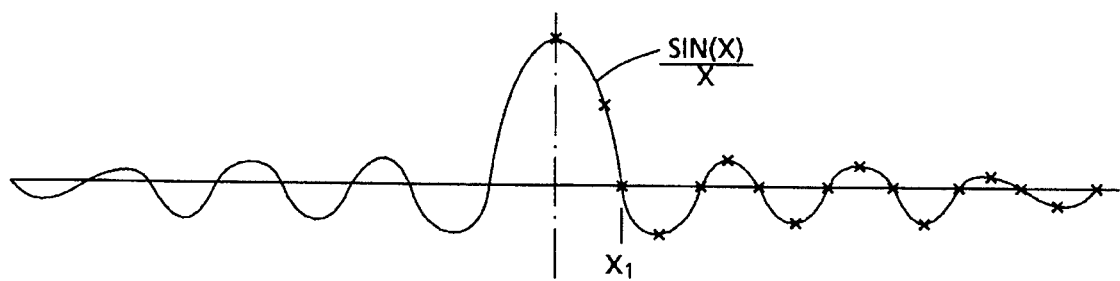
FIG. 4 shows a segment of a sin(x)/x function.

K=(number of lobes included in the sin(x)/x function+1)/2 $-(N-1)/2 \leq i \leq (N-1)/2$ as illustrated in FIG. 4 for the case where K=8. (See also FIG. 3).

From Fourier transform theory, the first null in the sin(x)/x function occurs at X=X1=π, so $$i = (N-1)/2K$$

and this value is related to the 3 -dB beam width ($\theta_3$) as $$\sin\theta_3 = \lambda/(id), \text{ where}$$

λ is the acoustic wavelength.

It turns out that the slope of the cutoff in the θ domain increases with the number of sin(x)/x lobes included in the array driving function. Since the required number of array elements increases with the number of lobes, the number chosen will be a compromise for each particular design.

Because the sin(x)/x function is truncated on any finite length array, the spatial beam pattern is not ideal in that it has secondary lobes approximately 25 dB below the main lobe level. These can be significantly reduced by the use of an additional scalar weighting on the velocity function having the form:

$$W_i = [\cos\pi \cdot i/(N+1)]^{1.6}$$

Using this shading, theoretical side lobe levels are suppressed more than 40 dB.

Figure 5:
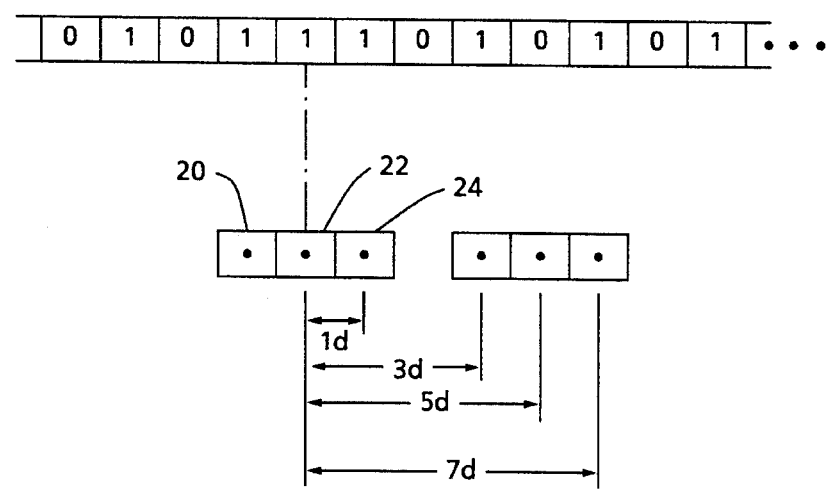
FIG. 5 shows an array of elements.

Certain choices of N and K are very advantageous. If N be chosen so that N=4K+1, then (N−1)/2 weights, or nearly half of the array weights will be identically zero. The zero weighted elements need not be implemented, thereby simplifying the array. As illustrated in FIG. 5, the three center elements 20, 22 and 24 of length d, are contiguously spaced at intervals of d, and the rest of the array elements are of length 2d and spacing 2d and contiguous except for the gap of d/2 between the second and third elements on each side of the array center. The total array length is given by:

$$L_A = (N-1)d = 4Kd$$

Figure 6:
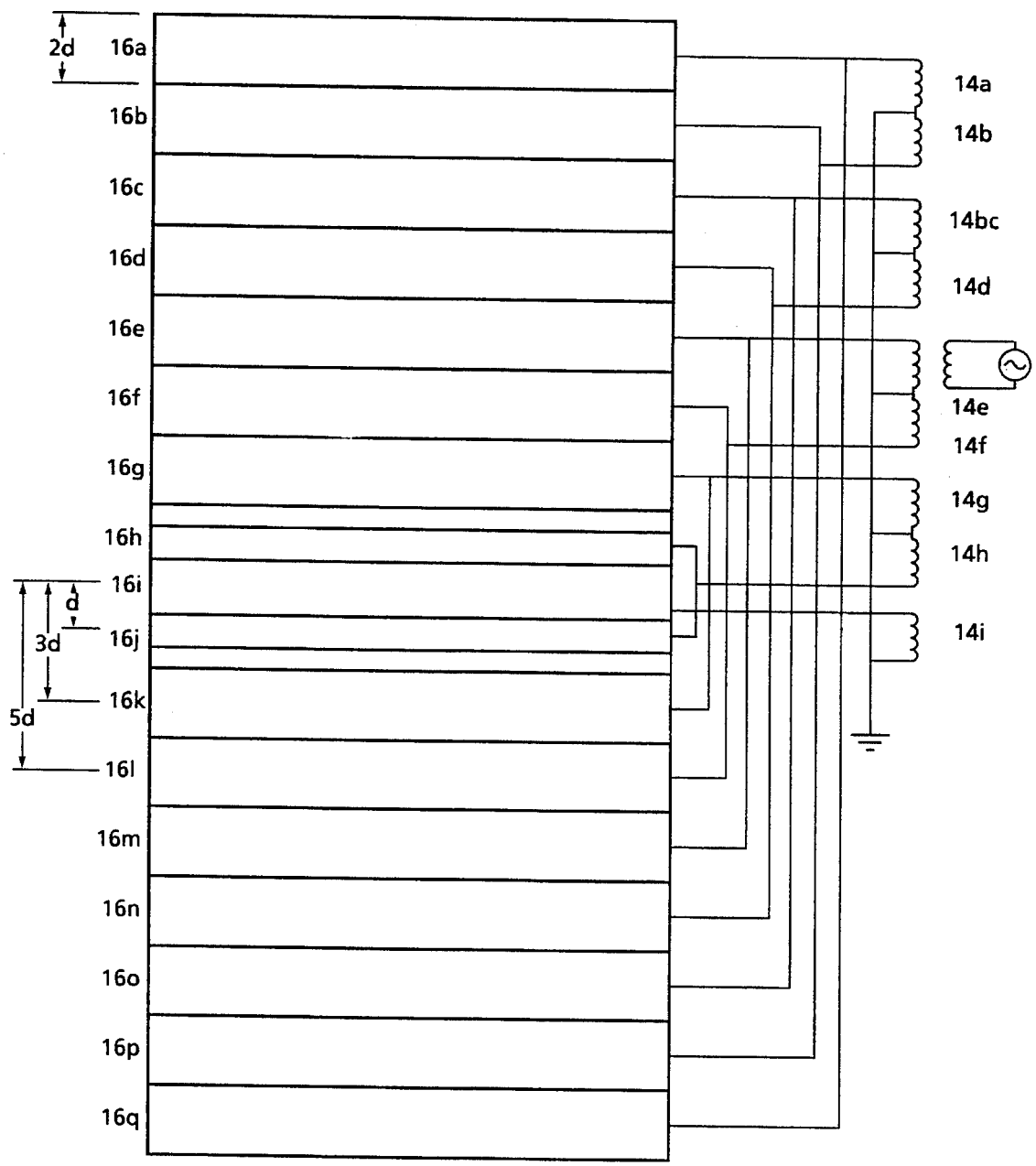
FIG. 6 shows a projector array spacing.

Because the weighting function has even symmetry about the array, the element pairs equidistant from the array center can be electrically connected together and driven by the same voltage, as illustrated in FIG. 6. The required drive voltages can be conveniently derived from a single power amplifier via a multiple secondary transformer with turns ratios selected to provide the desired weighting function:

$$f_i = W_i \cdot \sin(x_i)/x_i, \text{ where}$$

$$x_i = (2K\pi i)/(N-1) \text{ and}$$

$$W_i = [\cos((\pi i)/(N+1))]^{1.6}$$

as illustrated in FIG. 6. This reduces the number of transformer secondaries to (N+3)/4, or about one fourth of the original number of weights selected.

The utility of the new method is best demonstrated by an example design. Suppose we desire an 80 degree beam width.

Choose: N=33,

K=8 and d=0.37λ.

This results in 17 non-zero array elements 16a–16q and requires only 9 transformer secondaries 14a–14i as shown in FIG. 6.

Figure 7:
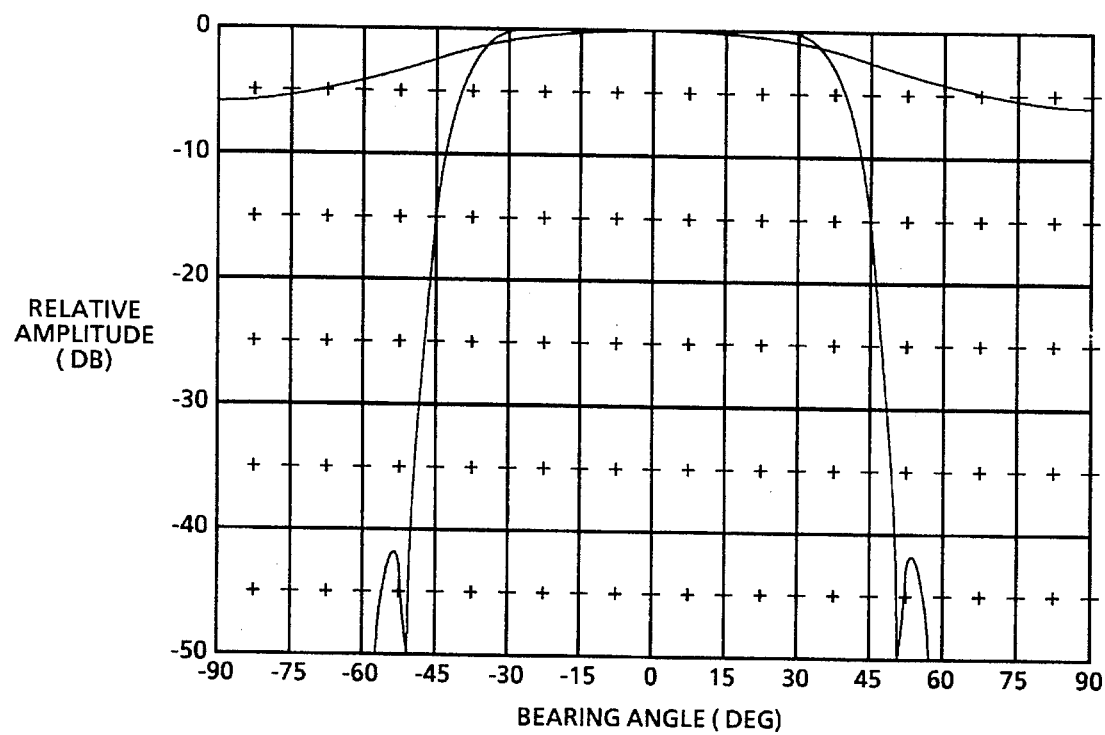
FIGS. 7 and 8 show comparisons of beam patterns.

The theoretical acoustic pressure pattern produced by the example design is shown in FIG. 7. The remarkably fast rolloff provides a pattern 80 degrees wide at the −3 dB points and only about 100 degrees wide at the −40 dB points. Also compared in this FIG. 7 is the response of a conventional unshaded line array designed for approximately the same beam width (using a 0.6 wavelength element). The improvement in surface reverberation rejection is clear.

Figure 8:
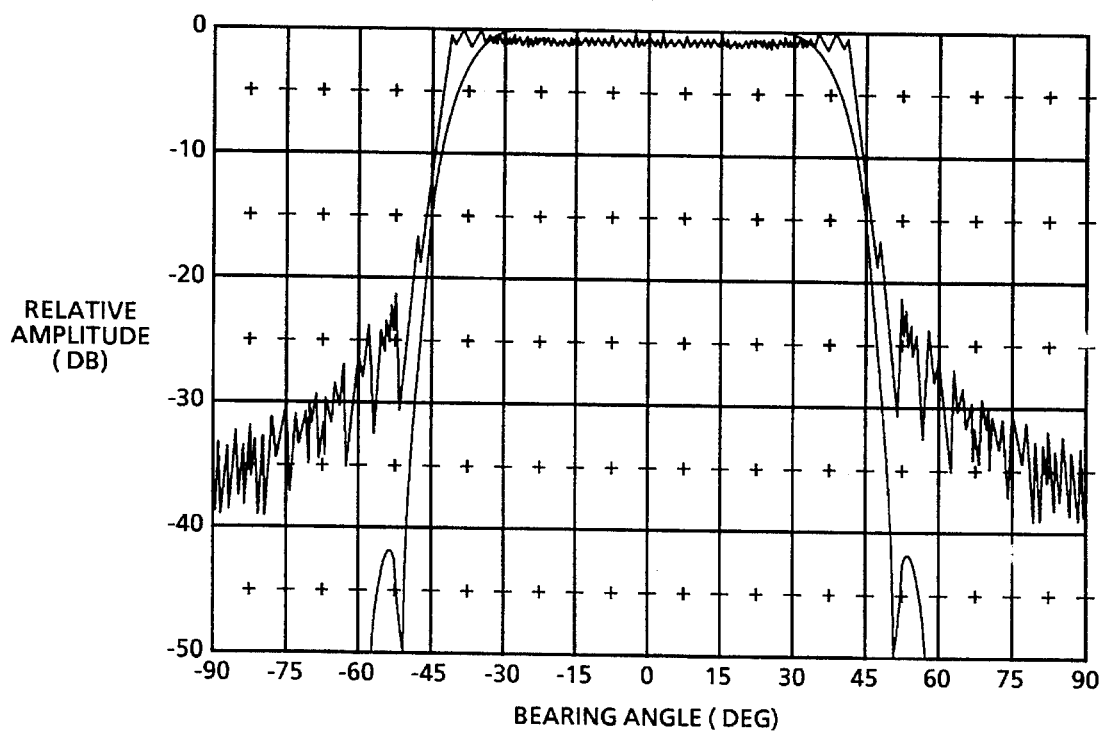

The response provided by the new method is compared with a different approach previously developed for the same purpose and shown in FIG. 8. The pattern improvement provided by the new method is evident and remarkable, but even more remarkable is the fact that the new method requires only about half as much piezoelectric material and its size is independent of the sonar vehicle diameter.

It will be evident to those skilled in the art that this type of beam shaping has several advantages over conventional approaches:

1. All line segments are driven with the same phase.

2. No phase delay or time delay networks are needed.

3. No power is dissipated in shading resistors.

4. All segments can be driven by a single power amplifier.

5. Beam patterns have the maximum possible rolloff because the Fourier Transform of the weighting function is, in fact, the rectangular pulse.

It will also be evident that the same array design can be used as a receiver (hydrophone) with several advantages over conventional approaches:

1. No phase or time delay networks are needed.

2. Individual stave preamplifiers are not needed.

I claim:

1. A pulsed-transmission, single frequency echo-ranging sonar system comprising an antenna having a segmented array of transducer elements, wherein the total array length is $L_A$, and $L_A = (N-1)d = 4\ Kd$ where N= the number of array elements (an odd mumber), d= the spacing between the midpoints of the middle three array elements and K= a number directly proportional to the number of lobes included in the sin(x)/x function, and an electrical power source connected to the array.

2. A system as set forth in claim 1 in which the middle three array elements are separated from the remaining array elements by a distance d.

3. A system as set forth in claim 2 in which the remaining array elements are each of length 2d and are each separated by a distance 2d.

4. A system as set forth in claim 3 in which the power source includes a single power amplifier and a multiple secondary transformer and in which nearly one half of the array elements are zero weighted.

5. A system as set forth in claim 4 in which the array elements are driven in the same phase.

\* \* \* \* \*